(12) United States Patent
Nilsson

(10) Patent No.: US 10,440,727 B2
(45) Date of Patent: Oct. 8, 2019

(54) CO-SCHEDULING OF TERMINAL DEVICES

(71) Applicant: Telefonaktiebolaget LM Ericsson (publ), Stockholm (SE)

(72) Inventor: Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/560,034

(22) PCT Filed: Aug. 29, 2017

(86) PCT No.: PCT/EP2017/071588
§ 371 (c)(1),
(2) Date: Sep. 20, 2017

(87) PCT Pub. No.: WO2019/042527
PCT Pub. Date: Mar. 7, 2019

(65) Prior Publication Data
US 2019/0069309 A1    Feb. 28, 2019

(51) Int. Cl.
*H04W 72/12*    (2009.01)
*H04B 7/06*    (2006.01)
(Continued)

(52) U.S. Cl.
CPC ........ *H04W 72/121* (2013.01); *H04B 7/0617* (2013.01); *H04B 7/0695* (2013.01);
(Continued)

(58) Field of Classification Search
CPC .................. H04W 72/046; H04W 72/121
See application file for complete search history.

(56) References Cited

U.S. PATENT DOCUMENTS

2015/0103934 A1    4/2015   Nam et al.
2015/0365939 A1*   12/2015  Zhang ............... H04W 72/0446
                                                              370/336
(Continued)

OTHER PUBLICATIONS

International Search Report and Written Opinion dated May 25, 2018 issued in International Application No. PCT/EP2017/071588. (14 pages).

(Continued)

*Primary Examiner* — Pao Sinkantarakorn
(74) *Attorney, Agent, or Firm* — Rothwell, Figg, Ernst & Manbeck, P.C.

(57) ABSTRACT

There is provided mechanisms for evaluating co-scheduling of terminal devices. A method is performed by a network node. The method comprises obtaining an indication that a terminal device served by the network node is involved in a data session being longer than a threshold time value. The method comprises initiating, as a result of the data session being longer than the threshold time value, a beam sweep procedure using analog beamforming with the terminal device. The beam sweep procedure results in identification of a set of candidate beams in which the network node is able to serve the terminal device during the data session. The method comprises evaluating whether to co-schedule the terminal device with another terminal device in any of the candidate beams or not. The so-called another terminal device is also served by the network node.

29 Claims, 4 Drawing Sheets

(51) Int. Cl.
*H04W 16/28* (2009.01)
*H04L 5/00* (2006.01)
*H04W 88/06* (2009.01)

(52) U.S. Cl.
CPC .......... *H04L 5/0048* (2013.01); *H04L 5/0057* (2013.01); *H04W 16/28* (2013.01); *H04W 88/06* (2013.01)

(56) References Cited

U.S. PATENT DOCUMENTS

2017/0055281 A1   2/2017  Islam et al.
2018/0006696 A1*  1/2018  Yue .................... H04W 72/046

OTHER PUBLICATIONS

CMCC, "Joint selection and CSI feedback for analog and digital beam", R1-1708391, vol. RAN WG1, No. Hangzhou, China; 20170515-20170519 (May 14, 2017), XP051273584. (5 pages).

* cited by examiner

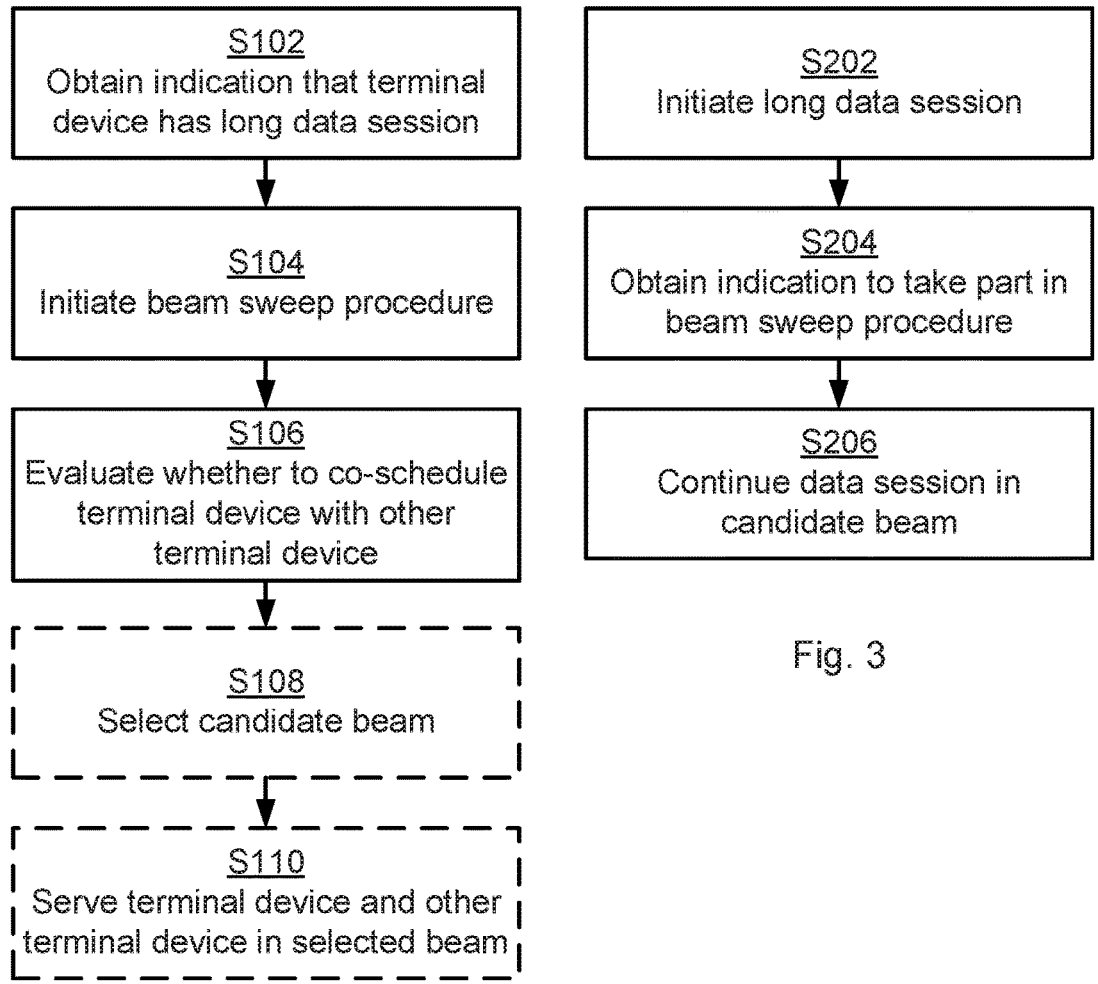

CO-SCHEDULING OF TERMINAL DEVICES

CROSS REFERENCE TO RELATED APPLICATION(S)

This application is a 35 U.S.C. § 371 National Stage of International Patent Application No. PCT/EP2017/071588, filed Aug. 29, 2017, designating the United States, the disclosure of which is incorporated by reference.

TECHNICAL FIELD

Embodiments presented herein relate to a method, a network node, a computer program, and a computer program product for evaluating co-scheduling of terminal devices. Embodiments presented herein further relate to a method, a terminal device, a computer program, and a computer program product for facilitating co-scheduling of terminal devices.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

In general terms, the use of beamforming could imply that the terminal devices will be not only operatively connected to the network node via a beam but also performs a handover between (narrow) beams instead of between network nodes of different cells, or between transmission and reception points (TRPs) of one and the same network node. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node to keep track of its served terminal devices with narrow beams (as used at the TRP of the network node and/or at the terminal devices) in order to increase coverage and throughput.

A suitable TRP transmission beam for each terminal device is expected to be discovered by the terminal devices and monitored by the network using measurements on downlink reference signals used for beam management, such as channel state information reference signal (CSI-RS), as performed by the terminal devices. The downlink reference signals could, for beam management purposes, be transmitted periodically, semi-persistently or aperiodically (e.g. being event triggered) and they can be either shared between multiple terminal devices or be specific for a particular terminal device. In order to find a suitable transmission beam to each terminal device the TRP transmits reference signals in different TRP transmission beams on which the terminal devices performs measurements, such as measurements of reference signal received power (RSRP), and reports back the Nbest TRP transmission beams (where N can be configured by the network).

The terminal devices and/or the TRP of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different terminal devices, different implementations will be needed.

One drawback with an analog beamforming implementation is that the TRP only can transmit or receive in one beam at a time (assuming one antenna array, and that on and the same beam is used for all polarizations, which typically is the case in order to counteract dropped signal strength due to polarization mismatching). This reduces the possibility to serve multiple terminal devices simultaneously (by e.g. using frequency multiplexing).

In order to increase the possibility to co-schedule terminal devices simultaneously in the same TRP transmission beam (when analog beamforming is used), as much information about which TRP transmission beams that are suitable for each terminal device is desirable. However, attaining this information at the TRP for all terminal devices in the network would require unnecessary high overhead signalling.

Hence, there is still a need for improved mechanisms for co-scheduling terminal devices.

SUMMARY

An object of embodiments herein is to provide mechanisms for efficient co-scheduling of terminal devices.

According to a first aspect there is presented a method for evaluating co-scheduling of terminal devices. The method is performed by a network node. The method comprises obtaining an indication that a terminal device served by the network node is involved in a data session being longer than a threshold time value. The method comprises initiating, as a result of the data session being longer than the threshold time value, a beam sweep procedure using analog beamforming with the terminal device. The beam sweep procedure results in identification of a set of candidate beams in which the network node is able to serve the terminal device during the data session. The method comprises evaluating whether to co-schedule the terminal device with another terminal device in any of the candidate beams or not. The so-called another terminal device is also served by the network node.

According to a second aspect there is presented a network node for evaluating co-scheduling of terminal devices. The network node comprises processing circuitry. The processing circuitry is configured to cause the network node to obtain an indication that a terminal device served by the network node is involved in a data session being longer than a threshold time value. The processing circuitry is configured to cause the network node to initiate, as a result of the data session being longer than the threshold time value, a beam sweep procedure using analog beamforming with the terminal device. The beam sweep procedure results in identification of a set of candidate beams in which the network node is able to serve the terminal device during the data session. The processing circuitry is configured to cause the network node to evaluate whether to co-schedule the terminal device with another terminal device in any of the candidate beams or not. The so-called another terminal device is also served by the network node.

According to a third aspect there is presented a network node for evaluating co-scheduling of terminal devices. The network node comprises processing circuitry and a storage medium. The storage medium stores instructions that, when executed by the processing circuitry, cause the network node to perform operations, or steps. The operations, or steps, cause the network node to obtain an indication that a terminal device served by the network node is involved in a data session being longer than a threshold time value. The operations, or steps, cause the network node to initiate, as a result of the data session being longer than the threshold time value, a beam sweep procedure using analog beamforming with the terminal device. The beam sweep procedure results in identification of a set of candidate beams in which the network node is able to serve the terminal device during the data session. The operations, or steps, cause the network node to evaluate whether to co-schedule the terminal device with another terminal device in any of the candidate beams or not. The so-called another terminal device is also served by the network node.

According to a fourth aspect there is presented a network node for evaluating co-scheduling of terminal devices. The network node comprises an obtain module configured to obtain an indication that a terminal device served by the network node is involved in a data session being longer than a threshold time value. The network node comprises an initiate module configured to initiate, as a result of the data session being longer than the threshold time value, a beam sweep procedure using analog beamforming with the terminal device. The beam sweep procedure results in identification of a set of candidate beams in which the network node is able to serve the terminal device during the data session. The network node comprises an evaluate module configured to evaluate whether to co-schedule the terminal device with another terminal device in any of the candidate beams or not. The so-called another terminal device is also served by the network node.

According to a fifth aspect there is presented a computer program for evaluating co-scheduling of terminal devices. The computer program comprises computer program code which, when run on processing circuitry of a network node, causes the network node to perform a method according to the first aspect.

According to a sixth aspect there is presented a method for facilitating co-scheduling of terminal devices. The method is performed by a terminal device. The method comprises initiating a data session being longer than a threshold time value when being served by a network node. The method comprises obtaining, as a result of the data session being longer than the threshold time value, an indication to take part in a beam sweep procedure with the network node. The beam sweep procedure results in identification of a set of candidate beams in which the network node is able to serve the terminal device during the data session. The method comprises continuing the data session in one of the candidate beams.

According to a seventh aspect there is presented a terminal device for facilitating co-scheduling of terminal devices. The terminal device comprises processing circuitry. The processing circuitry is configured to cause the terminal device to initiate a data session being longer than a threshold time value when being served by a network node. The processing circuitry is configured to cause the terminal device to obtain, as a result of the data session being longer than the threshold time value, an indication to take part in a beam sweep procedure with the network node. The beam sweep procedure results in identification of a set of candidate beams in which the network node is able to serve the terminal device during the data session. The processing circuitry is configured to cause the terminal device to continue the data session in one of the candidate beams.

According to an eighth aspect there is presented a terminal device for facilitating co-scheduling of terminal devices. The terminal device comprises processing circuitry and a storage medium. The storage medium stores instructions that, when executed by the processing circuitry, cause the terminal device to perform operations, or steps. The operations, or steps, cause the terminal device to initiate a data session being longer than a threshold time value when being served by a network node. The operations, or steps, cause the terminal device to obtain, as a result of the data session being longer than the threshold time value, an indication to take part in a beam sweep procedure with the network node. The beam sweep procedure results in identification of a set of candidate beams in which the network node is able to serve the terminal device during the data session. The operations, or steps, cause the terminal device to continue the data session in one of the candidate beams.

According to a ninth aspect there is presented a terminal device for facilitating co-scheduling of terminal devices. The terminal device comprises an initiate module configured to initiate a data session being longer than a threshold time value when being served by a network node. The terminal device comprises an obtain module configured to obtain, as a result of the data session being longer than the threshold time value, an indication to take part in a beam sweep procedure with the network node. The beam sweep procedure results in identification of a set of candidate beams in which the network node is able to serve the terminal device during the data session. The terminal device comprises a continue module configured to continue the data session in one of the candidate beams.

According to a tenth aspect there is presented a computer program for facilitating co-scheduling of terminal devices, the computer program comprising computer program code which, when run on processing circuitry of a terminal device, causes the terminal device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network nodes, these terminal devices, and these computer programs provide efficient co-scheduling of terminal devices.

Advantageously these methods, these network nodes, these terminal devices, and these computer programs enable the network to serve multiple terminal devices simultaneously (by for example frequency multiplexing) for a TRP with analog beamforming architecture, without having to perform exhaustive TRP transmission beam sweeps and beam reporting for each and every terminal device, thus reducing overhead signalling.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2 and 3 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
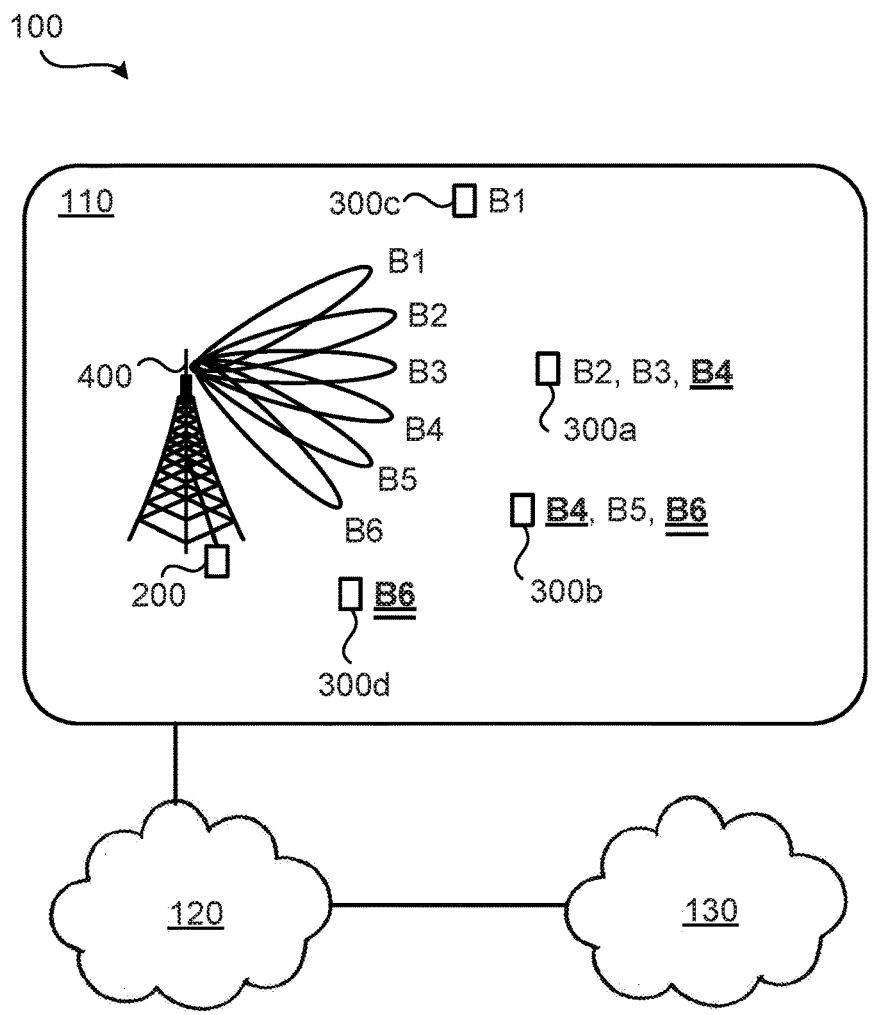
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises a network node 200 that is configured to provide network access to terminal devices 300a, 300b, 300c, 300d in a radio access network no. The radio access network no is operatively connected to a core network 120. The core network 120 is in turn operatively connected to a service network 130, such as the Internet. The terminal devices 300a, 300b, 300c, 300d are thereby, via the network node 200, enabled to access services of, and exchange data with, the service network 130. Examples of network nodes 200 are radio access network nodes, radio base stations, base transceiver stations, Node Bs, evolved Node Bs, gigabit Node Bs, access points, and access nodes. Examples of terminal devices 300a, 300b, 300c, 300d are wireless devices, mobile stations, mobile phones, handsets, wireless local loop phones, user equipment (UE), smartphones, laptop computers, tablet computers, network equipped sensors, network equipped vehicles, and so-called Internet of Things devices.

The network node 200 provide network access in the radio access network no by transmitting signals to, and receiving signals from, the terminal device 300a, 300b, 300c, 300d in beams B1, B2, B3, B4, B5, B6. In the example of FIG. 1 it is for illustrative and non-limiting purposes assumed that terminal device 300a can be served in beams B2, B3, B4, that terminal device 300b can be served in beams B4, B5, B6, that terminal device 300c can be served in beam B1, and that terminal device 300d can be served in beam B6. The signals could be transmitted from, and received by, a TRP 400 of the network node 200. The TRP 400 could form an integral part of the network node 200 or be physically separated from the network node 200.

As disclosed above there is still a need for improved mechanisms for co-scheduling terminal devices 300a, 300b, 300c, 300d. In today's networks, the traffic profile is such that the majority of data sessions of terminal devices 300a, 300b, 300c, 300d are very short. However, a significant part of the data traffic of the data sessions is generated during longer data sessions, such as from data sessions relating to streaming of music or videos, voice calls etc. for the terminal devices 300a, 300b, 300c, 300d. Therefore, at least some of the herein disclosed embodiments are based on seeking to co-schedule those terminal devices that have comparatively long data sessions.

Reference is now made to FIG. 2 illustrating a method for evaluating co-scheduling of terminal devices 300a, 300b, 300c, 300d as performed by the network node 200 according to an embodiment.

As disclosed above, the co-scheduling is based on whether the terminal devices 300a, 300b, 300c, 300d are involved in comparatively long data sessions or not. Therefore, the network node 200 is configured to perform step S102:

S102: The network node 200 obtains an indication that a terminal device 300a served by the network node 200 is involved in a data session that is longer than a threshold time value. Examples of such indications will be provided below. The threshold time value could be configurable by the network.

The indication that the terminal device 300a is involved in a data session that is longer than the threshold time value serves as a trigger for the network node 200 to consider co-scheduling of the terminal device 300a with at least one other terminal device 300b, 300c, 300d. Thus the network node 200 is configured to perform step S104:

S104: The network node 200 initiates, as a result of the data session being longer than the threshold time value, a beam sweep procedure with the terminal device 300a. The beam sweep procedure uses analog beamforming. The beam sweep procedure results in identification of a set of candidate beams B2, B3, B4 in which the network node 200 is able to serve the terminal device 300a during the data session. Serving the terminal device 300a could involve transmitting data to the terminal device 300a in one of the candidate beams B2, B3, B4. Examples of beam sweep procedures will be provided below. Examples of how to identify the set of candidate beams B2, B3, B4 will be disclosed below.

Possible co-scheduling of the terminal device 300a is then evaluated for the set of candidate beams B2, B3, B4. Particularly, the network node 200 is configured to perform step S106:

S106: The network node 200 evaluates whether to co-schedule the terminal device 300a with at least one other terminal device 300b, 300c, 300d in any of the candidate beams B2, B3, B4 or not. These other terminal devices 300b, 300c, 300d are also served by the network node 200.

Embodiments relating to further details of evaluating co-scheduling of terminal devices 300a, 300b, 300c, 300d as performed by the network node 200 will now be disclosed.

In some aspects the co-scheduling is exclusively considered only for terminal devices involved in comparatively long data session. Thus, according to an embodiment the so-called another terminal device 300b also is involved in a data session being longer than the threshold time value.

In some aspects the evaluation in step S106 results in actual co-scheduling of the terminal device 300a with at least one other terminal device 300b, 300c, 300d. In other words, the beam sweep procedure results in identification of at least one beam in which the terminal device 300a can be co-scheduled with at least one other terminal device 300b, 300c, 300d. Particularly, according to an embodiment the network node 200 is configured to perform (optional) steps S108, S110:

S108: The network node 200 selects one (say, beam B4) of the candidate beams B2, B3, B4.

S110: The network node 200 serves the terminal device 300a and the so-called another terminal device 300b in this one (say, beam B4) of the candidate beams B2, B3, B4. The network node 200 thereby co-schedules the terminal device 300a with the so-called another terminal device 300b.

There could be different ways to indicate that the terminal device 300a is involved in a long data session.

In some aspects the indication is an indication of the service used by the terminal device 200a (such as information from high protocol layers, such as any of the application, presentation, or session layers). That is, according to an embodiment, the indication indicates which type of service the data session relates to. Examples of such services are audio streaming, video streaming and voice calls.

Which type of service the data session relates to, or alternatively which application is used by the terminal device 300a, could be detected by the network node 200 receiving explicit signaling from the network or from the terminal device 300a, by deep packet inspection, or from buffer status reports. Thus, according to an embodiment, the indication is obtained from deep packet inspection of packets belonging to the data session. Further, according to an embodiment, the indication is obtained from buffer status reports at the network node 200, where the buffer status reports relate to the data session.

There could be different examples of beam sweep procedures initiated by the network node 200 in step S104. In general terms, the beam sweep should be comprehensive so as to cover beams in many different directions such that as many suitable transmission beams as possible could be identified for the respective terminal devices.

In some aspects the beam sweep procedure involves transmitting in the beam currently serving the terminal device 300a as well as in surrounding beam(s). Particularly, according to an embodiment the terminal device 300a is served by a current beam (say, beam B3) when the network node 200 obtains the indication. The network node 200 then, during the beam sweep procedure, causes reference signals to be transmitted only in beams (say, beams B2, B4) neighbouring (in directional/angular sense) this current beam. The network node 200 thereby performs a limited beam search procedure. In some aspects the network node 200, during the beam sweep procedure, causes reference signals to be transmitted in the K closest (in directional/angular sense) beams to the current beam, where K is an integer that could be configured by the network. In the most recent embodiment K=2, but it could be that K=3, or K=4, or K=5, etc.

In some aspects the beam sweep procedure involves transmitting in the beams currently serving the terminal devices 300a, 300b as well as any beam(s) in between (in directional/angular sense). Particularly, according to an embodiment the terminal device 300a is served by a first current beam (say, beam B3) when the network node 200 obtains the indication, and the so-called another terminal device 300b is served by a second current beam (say, beam B5) when the network node 200 obtains the indication. The network node 200 then, during the beam sweep procedure, causes reference signals to be transmitted only in any beams (in the example of FIG. 1: beam B4) in between the first current beam and the second current beam in addition to the first current beam and the second current beam. The network node 200 thereby performs a limited beam search procedure.

In some aspects the beam sweep procedure involves an exhaustive search. That is, according to an embodiment the network node 200, during the beam sweep procedure, causes reference signals to be transmitted in all beams B1, B2, B3, B4, B5, B6 used by the network node 200. The network node 200 thereby performs an exhaustive beam search procedure.

In some aspects the beam sweep procedure is shared between two or more terminal devices. That is, according to an embodiment the beam sweep procedure is shared at least between the terminal device 300a and the so-called another terminal device 300b. All the identified terminal devices could thereby measure on the same reference signals. In this way the overhead signaling caused by transmitting the reference signal could be kept at a minimum. In some aspects, the terminal devices for which the beam sweep procedure is shared are all involved in respective data sessions that are longer than the threshold time value.

There could be different ways to identify the set of candidate beams.

In some aspects the identification of candidate beams B2, B3, B4 is accomplished by means of reports from the terminal devices. That is, according to an embodiment the identification of the set of candidate beams B2, B3, B4 is provided in a report from the terminal device 300a.

In some aspects the reports indicate measurements (such as Reference Signal Received Power (RSRP), Channel Quality Indicator (CQI), etc.) of reference signals transmitted in the candidate beams. That is, according to an embodiment the report indicates measurements, as obtained by the terminal device 300a, of reference signals, as transmitted by a TRP 400 of the network node 200 during the beam sweep procedure, at least in the candidate beams B2, B3, B4. It could be that the report only indicates measurements with a RSRP value and/or a CQI value over a threshold value. This threshold value could be configured by the network.

There could be additional aspects to consider when evaluating whether to co-schedule the terminal device 300a. For example, the decision whether to co-schedule two or more terminal devices in the same beam could consider multiple different aspects, as for example CQI for the different beams, required bandwidth for the data transmission for respective terminal device and beam, etc. Particularly, according to an embodiment, whether to co-schedule the terminal device 300a with the so-called another terminal device 300b is further based on a data rate requirement of at least one of the data session of the terminal device 300a and the data session of the so-called another terminal device 300b.

There could be different ways to co-schedule the terminal device 300a with the so-called another terminal device 300b.

In some aspects the co-scheduling involves frequency multiplexing. Particularly, according to an embodiment, co-scheduling the terminal device 300a with the so-called another terminal device 300b comprises frequency-division multiplexing data transmitted to the terminal device 300a and data transmitted to the so-called another terminal device 300b.

In some aspects the co-scheduling involves code multiplexing.

Particularly, according to an embodiment, co-scheduling the terminal device 300a with the so-called another terminal device 300b comprises code-division multiplexing data transmitted to the terminal device 300a and data transmitted to the so-called another terminal device 300b.

It is understood that the terminal device 300a could be co-scheduled with more than one other terminal device 300b.

Reference is now made to FIG. 3 illustrating a method for facilitating co-scheduling of terminal devices 300a, 300b, 300c, 300d as performed by the terminal device 300a according to an embodiment.

It is assumed that the terminal device 300a is involved in a data session. The data session could involve transmission and/or reception of data by the terminal device 300. Particularly, the terminal device 300a is configured to perform step S202:

S202: The terminal device 300a initiates a data session. The data session is longer than a threshold time value. The data session is initiated when the terminal device 300a is served by the network node 200.

As disclosed above, the network node 200 evaluates whether to co-schedule the terminal device 300a. The terminal device 300a is therefore configured to perform step S204:

S204: The terminal device 300a obtains, as a result of the data session being longer than the threshold time value, an indication to take part in a beam sweep procedure with the network node 200. The beam sweep procedure results in identification of a set of candidate beams B2, B3, B4 in which the network node 200 is able to serve the terminal device 300a during the data session.

It is assumed that a beam is found for the terminal device 300a to be served in. Thus, the terminal device 300a is configured to perform step S206:

S206: The terminal device 300a continues the data session (with the network node 200) in one (say, beam B4) of the candidate beams B2, B3, B4.

Embodiments relating to further details of facilitating co-scheduling of terminal devices 300a, 300b, 300c, 300d as performed by the terminal device 300a will now be disclosed.

The beam in which the data session is continued in step S206 could either be the same or a different beam than the beam originally used for the data session. That is, in some aspects the co-scheduling causes the terminal device 300a to switch beam. That is, according to an embodiment the terminal device 300a is served by a current beam (say, beam B3) when the terminal device 300a obtains the indication, and this one of the candidate beams in which the data session is continued is different from this current beam. In some aspects the co-scheduling occurs in the original beam of the data session. That is, according to an embodiment the terminal device 300a is served by a current beam (say, beam B4) when the terminal device 300a obtains the indication, and this one of the candidate beams in which the data session is continued is identical to this current beam.

As disclosed above, there could be different ways to identify the set of candidate beams.

In some aspects the identification of candidate beams B2, B3, B4 is accomplished by means of reports from the terminal devices. That is, according to an embodiment the identification of the set of candidate beams is provided in a report from the terminal device 300a. As further disclosed above, the report could indicate measurements, as obtained by the terminal device 300a, of reference signals, as transmitted by a TRP 400 of the network node 200 during the beam sweep procedure, at least in the candidate beams.

In this respect the terminal device 300a could be configured to evaluate all transmission beams that might be suitable for data transmission, for example by detecting which transmissions beams that have an RSRP over a certain threshold, or a CQI over a certain threshold etc. Particularly, the report might only indicate measurements with RSRP value and/or a CQI value over a threshold value.

With reference again to FIG. 1, for illustrative purposes it is now assumed that the network node 200 identifies that terminal devices 300a, 300b, 300c are involved in long data sessions (as in steps S102, S202). The network node 200 therefore performs a beam sweep procedure for these terminal devices 300a, 300b, 300c (as in steps S104, S204) and terminal device 300a reports that beams B2, B3, B4 could be used for that terminal device, terminal device 300b reports that beams B4, B5, B6 could be used for that terminal device, and terminal device 300c reports that only beam B6 could be used for that terminal device (as in step S106). Hence, terminal devices 300a, 300b could be co-scheduled in beam B4, and/or terminal devices 300b, 300c could be co-scheduled in beam B6 (as in steps S108, S110, S206).

Figure 4:
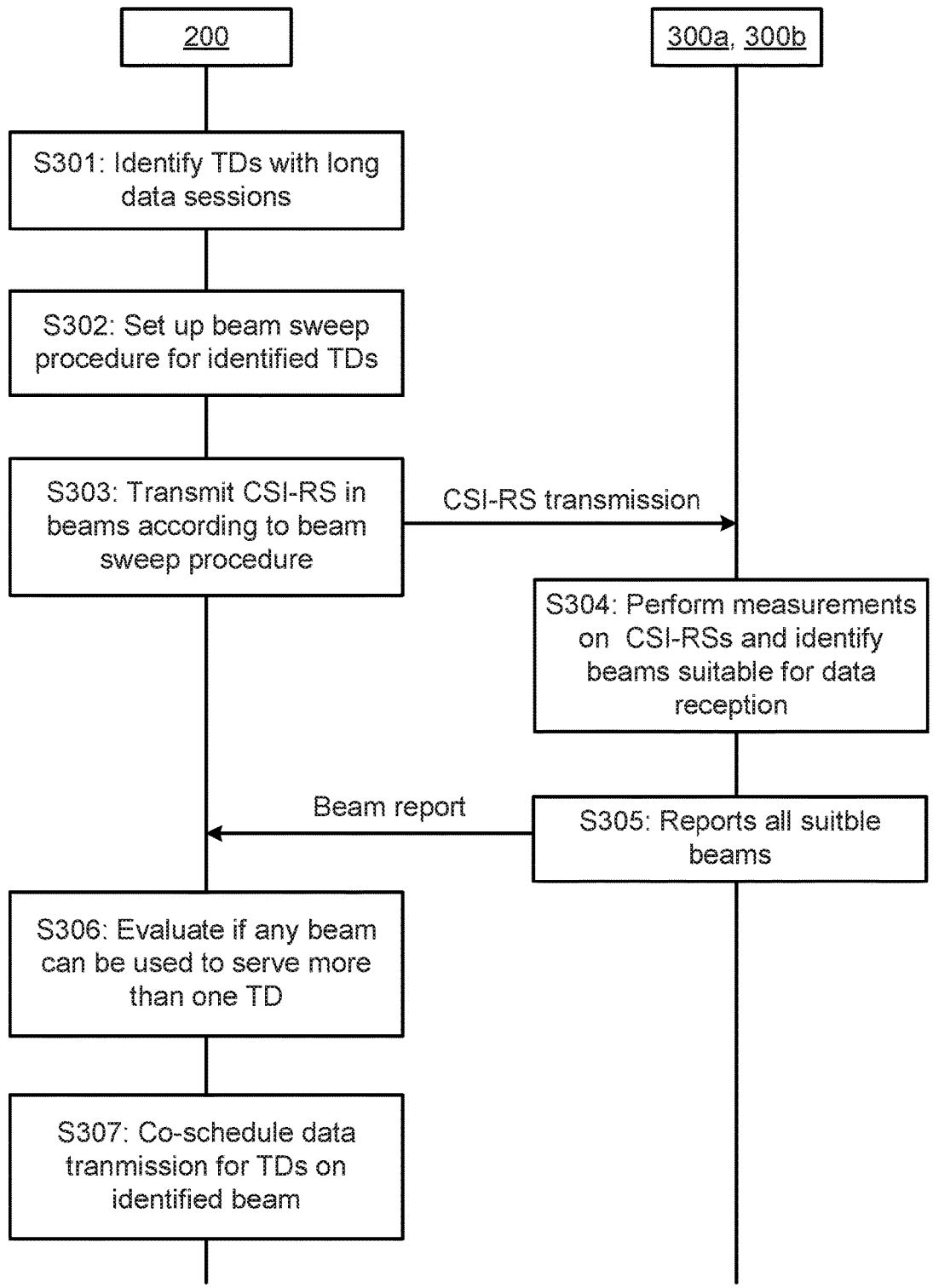
FIG. 4 is a signalling diagram according to embodiments.

One particular embodiment for evaluating and facilitating co-scheduling of terminal devices 300a, 300b, 300c, 300d based on at least some of the above disclosed embodiments will now be disclosed in detail with reference to the signalling diagram of FIG. 4.

S301: The network node 200 identifies which served terminal devices that are expected to use data sessions longer than a certain threshold time value. One way to implement step S301 is to perform step S102.

S302: The network node 200 sets up an aperiodic beam sweep procedure for the identified terminal devices.

S303: The network node 200 initiates transmission of reference signals, such as CSI-RS, in the relevant beams (as defined by the set of candidate beams). One way to implement step S303 is to perform step S104.

S304: The terminal devices 300a, 300b perform measurements on the beams and evaluate which of these candidate beams are suitable for data transmission. One way to implement step S304 is to perform step S204.

S305: The terminal devices 300a, 300b report RSRP values and/or CQI values for all beams suitable for data transmission. One way to implement step S304 is to perform step S204.

S306: The network node 200 has information of which beams that are suitable for which terminal devices 300a, 300b and hence evaluates which (if any) terminal devices 300a, 300b that can be served with the same beam. One way to implement step S306 is to perform step S106.

S307: The network node 200 co-schedules terminal devices 300a, 300b that can be served in the same beam. One way to implement step S307 is to perform steps S108, S110.

In summary, according to at least some of the herein disclosed embodiments involves the network node 200 to detect terminal devices 300a, 300b that use applications with long data sessions. The network node 200 then sets up a beam sweep procedure in order to find suitable beams for each of these identified terminal devices 300a, 300b. During the beam sweep procedure the TRP configures all the identified terminal devices 300a, 300b to report all beams that are good enough (e.g. RSRP value or CQI value being larger than a certain threshold). The network node 200 then uses this information to evaluate if any of the identified terminal devices 300a, 300b can be served simultaneously in the same beam. If so, the network node 200 co-schedules these terminal devices 300a, 300b in the same beam.

Figure 5:
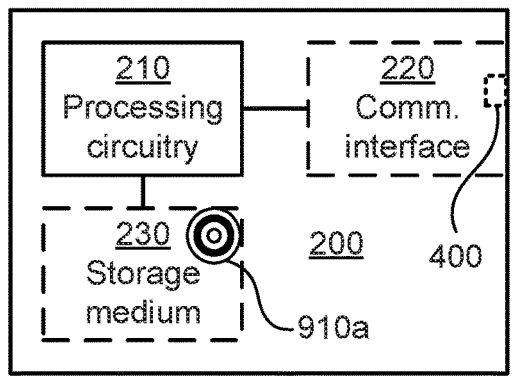
FIG. 5 is a schematic diagram showing functional units of a network node according to an embodiment.

FIG. 5 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S110, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, nodes, devices, and function of the communications network 100, such as terminal devices 300a, 300b, 300c, 300d. As such the communications interface 220 may comprise one or more transmitters and receivers, comprising analogue and digital components. Signals could be transmitted from, and received by, a TRP 400 of the network node 200. The TRP 400 could form an integral part of the network node 200 or be physically separated from the network node 200. The communications interface 220 might thus optionally comprise the TRP 400.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 6:
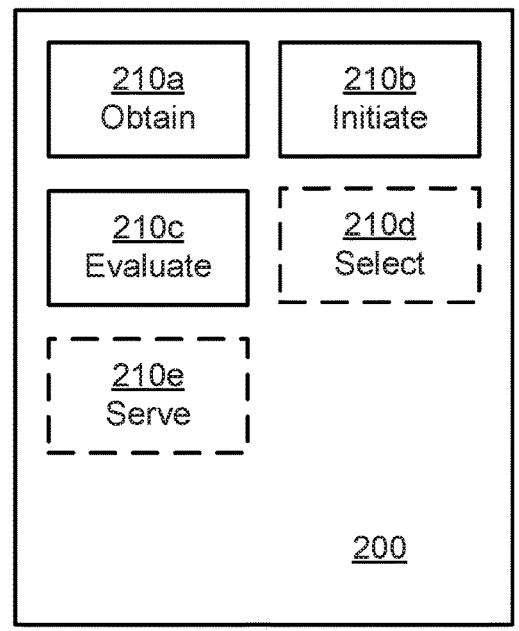
FIG. 6 is a schematic diagram showing functional modules of a network node according to an embodiment.

FIG. 6 schematically illustrates, in terms of a number of functional modules, the components of a network node 200 according to an embodiment. The network node 200 of FIG. 6 comprises a number of functional modules; an obtain module 210a configured to perform step S102, an initiate module 210b configured to perform step S104, and an evaluate module 210C configured to perform step S106. The network node 200 of FIG. 6 may further comprise a number of optional functional modules, such as any of a select module 210d configured to perform step S108 and a serve module 210e configured to perform step S110. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the network node 200 as disclosed herein.

The network node 200 may be provided as a standalone device or as a part of at least one further device. For example, the network node 200 may be provided in a node of the radio access network no or in a node of the core network 120. Alternatively, functionality of the network node 200 may be distributed between at least two devices, or nodes. These at least two nodes, or devices, may either be part of the same network part (such as the radio access network no or the core network 120) or may be spread between at least two such network parts. In general terms, instructions that are required to be performed in real time may be performed in a device, or node, operatively closer to the cell served by the network node 200 than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 5 the processing circuitry 210 may be distributed among a plurality of devices, or nodes. The same applies to the functional modules 210a-210e of FIG. 6 and the computer program 920a of FIG. 9 (see below).

Figure 7:
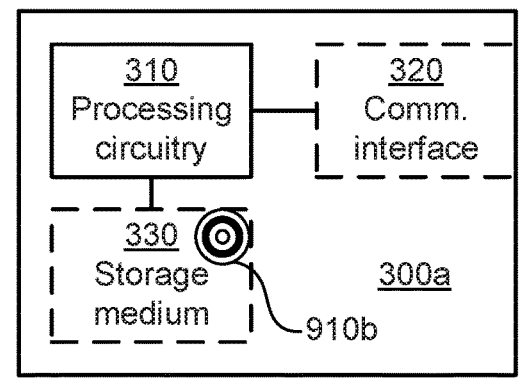
FIG. 7 is a schematic diagram showing functional units of a terminal device according to an embodiment.

FIG. 7 schematically illustrates, in terms of a number of functional units, the components of a terminal device 300a according to an embodiment.

Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300a to perform a set of operations, or steps, S202-S206, as disclosed above. For example, the storage medium 330 may store the set of operations, and the processing circuitry 310 may be configured to retrieve the set of operations from the storage medium 330 to cause the terminal device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300a may further comprise a communications interface 320 for communications with other entities, nodes, devices, and function of the communications network 100, such as network 200 (via TRP 400). As such the communications interface 320 may comprise one or more transmitters and receivers, comprising analogue and digital components.

The processing circuitry 310 controls the general operation of the terminal device 300a e.g. by sending data and control signals to the communications interface 320 and the storage medium 330, by receiving data and reports from the communications interface 320, and by retrieving data and instructions from the storage medium 330. Other components, as well as the related functionality, of the terminal device 300a are omitted in order not to obscure the concepts presented herein.

Figure 8:
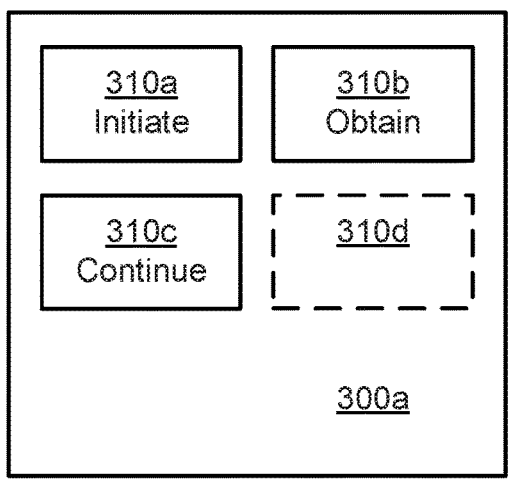
FIG. 8 is a schematic diagram showing functional modules of a terminal device according to an embodiment.

FIG. 8 schematically illustrates, in terms of a number of functional modules, the components of a terminal device 300a according to an embodiment. The terminal device 300a of FIG. 8 comprises a number of functional modules; an initiate module 310a configured to perform step S202, an obtain module 310b configured to perform step S204, and a continue module 3 we configured to perform step S206. The terminal device 300a of FIG. 8 may further comprise a number of optional functional modules, such as represented by functional module 310d. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the terminal device 300a as disclosed herein.

Figure 9:
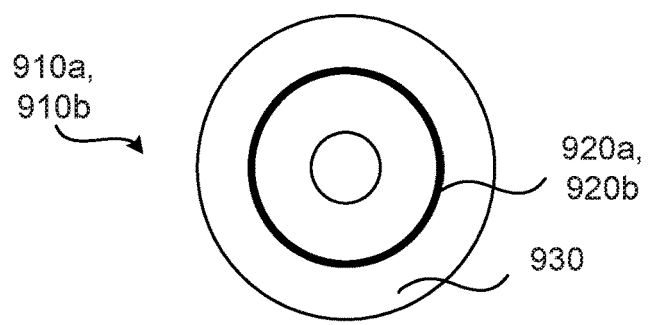
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the network node 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the terminal device 300a as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for evaluating co-scheduling of terminal devices, the method being performed by a network node, the method comprising:
  obtaining an indication that a terminal device served by the network node is involved in a data session being longer than a threshold time value;
  initiating, as a result of the data session being longer than the threshold time value, a beam sweep procedure using analog beamforming with the terminal device, the beam sweep procedure resulting in identification of a set of candidate beams in which the network node is able to serve the terminal device during the data session; and
  evaluating whether to co-schedule the terminal device with another terminal device in any of the candidate beams or not, said another terminal device also being served by the network node.

2. The method of claim 1, wherein said another terminal device also is involved in a data session being longer than the threshold time value.

3. The method of claim 2, wherein whether to co-schedule the terminal device with said another terminal device is further based on a data rate requirement of at least one of the data session of the terminal device and the data session of said another terminal device.

4. The method of claim 1, further comprising:
  selecting one of the candidate beams; and
  serving the terminal device and said another terminal device in said one of the candidate beams, thereby co-scheduling the terminal device with said another terminal device.

5. The method of claim 1, wherein the indication indicates which type of service the data session relates to.

6. The method of claim 1, wherein the indication is obtained from deep packet inspection of packets belonging to the data session.

7. The method of claim 1, wherein the indication is obtained from buffer status reports at the network node, the buffer status reports relating to the data session.

8. The method of claim 1, wherein the terminal device is served by a current beam when the network node obtains the indication, and wherein the network node, during the beam sweep procedure, causes reference signals to be transmitted only in beams neighboring said current beam, thereby performing a limited beam search procedure.

9. The method of claim 1, wherein the terminal device is served by a first current beam when the network node obtains the indication, wherein said another terminal device is served by a second current beam when the network node obtains the indication, and wherein the network node, during the beam sweep procedure, causes reference signals to be transmitted only in any beams in between said first current beam and said second current beam in addition to said first current beam and said second current beam, thereby performing a limited beam search procedure.

10. The method of claim 1, wherein the network node, during the beam sweep procedure, causes reference signals to be transmitted in all beams used by the network node, thereby performing an exhaustive beam search procedure.

11. The method of claim 1, wherein the beam sweep procedure is shared between the terminal device and said another terminal device.

12. The method of claim 1, wherein the identification of the set of candidate beams is provided in a report from the terminal device.

13. The method of claim 12, wherein the report indicates measurements, as obtained by the terminal device, of reference signals, as transmitted by a TRP of the network node during the beam sweep procedure, at least in the candidate beams.

14. The method of claim 13, wherein the report only indicates measurements with a Reference Signal Received Power, RSRP, value and/or a Channel Quality Indicator, CQI, value over a threshold value.

15. The method of claim 1, wherein co-scheduling the terminal device with said another terminal device comprises frequency-division multiplexing data transmitted to the terminal device and data transmitted to said another terminal device.

16. The method of claim 1, wherein co-scheduling the terminal device with said another terminal device comprises code-division multiplexing data transmitted to the terminal device and data transmitted to said another terminal device.

17. The method of claim 1, wherein serving the terminal device involves transmitting data to the terminal device in one of the candidate beams.

18. A method for facilitating co-scheduling of terminal devices, the method being performed by a terminal device, the method comprising:
  initiating a data session being longer than a threshold time value when being served by a network node;
  obtaining, as a result of the data session being longer than the threshold time value, an indication to take part in a beam sweep procedure with the network node, the beam sweep procedure resulting in identification of a set of candidate beams in which the network node is able to serve the terminal device during the data session; and
  continuing the data session in one of the candidate beams.

19. The method of claim 18, wherein the terminal device is served by a current beam when the terminal device obtains the indication, and wherein said one of the candidate beams in which the data session is continued is different from said current beam.

20. The method of claim 18, wherein the terminal device is served by a current beam when the terminal device obtains the indication, and wherein said one of the candidate beams in which the data session is continued is identical to said current beam.

21. The method of claim 18, wherein the identification of the set of candidate beams is provided in a report from the terminal device.

22. The method of claim 21, wherein the report indicates measurements, as obtained by the terminal device, of reference signals, as transmitted by a TRP of the network node during the beam sweep procedure, at least in the candidate beams.

23. The method of claim 22, wherein the report only indicates measurements with a Reference Signal Received Power, RSRP, value and/or a Channel Quality Indicator, CQI, value over a threshold value.

24. A network node for evaluating co-scheduling of terminal devices, the network node comprising processing circuitry, the processing circuitry being configured to cause the network node to:
  obtain an indication that a terminal device served by the network node is involved in a data session being longer than a threshold time value;
  initiate, as a result of the data session being longer than the threshold time value, a beam sweep procedure using analog beamforming with the terminal device, the beam sweep procedure resulting in identification of a set of candidate beams in which the network node is able to serve the terminal device during the data session; and
  evaluate whether to co-schedule the terminal device with another terminal device in any of the candidate beams or not, said another terminal device also being served by the network node.

25. The network node of claim 24, further comprising a non-transitory storage medium coupled to the processing circuitry, wherein the non-transitory storage medium stores instructions for configuring the processing circuitry to obtain the indication, initiate the beam sweep procedure, and perform the evaluation.

26. A terminal device for facilitating co-scheduling of terminal devices, the terminal device comprising processing circuitry, the processing circuitry being configured to cause the terminal device to:
  initiate a data session being longer than a threshold time value when being served by a network node;
  obtain, as a result of the data session being longer than the threshold time value, an indication to take part in a beam sweep procedure with the network node, the beam sweep procedure resulting in identification of a set of candidate beams in which the network node is able to serve the terminal device during the data session; and
  continue the data session in one of the candidate beams.

27. The terminal device of claim 26, further comprising a non-transitory storage medium coupled to the processing circuitry, wherein the non-transitory storage medium stores instructions for configuring the processing circuitry to initiate the data session, obtain the indication, and continue the data session.

28. A computer program product comprising a non-transitory computer readable medium storing a computer program for evaluating co-scheduling of terminal devices, the computer program comprising computer code which, when run on processing circuitry of a network node, causes the network node to:
- obtain an indication that a terminal device served by the network node is involved in a data session being longer than a threshold time value;
- initiate, as a result of the data session being longer than the threshold time value, a beam sweep procedure using analog beamforming with the terminal device, the beam sweep procedure resulting in identification of a set of candidate beams in which the network node is able to serve the terminal device during the data session; and
- evaluate whether to co-schedule the terminal device with another terminal device in any of the candidate beams or not, said another terminal device also being served by the network node.

29. A computer program product comprising a non-transitory computer readable medium storing a computer program for facilitating co-scheduling of terminal devices, the computer program comprising computer code which, when run on processing circuitry of a terminal device, causes the terminal device to:
- initiate a data session being longer than a threshold time value when being served by a network node;
- obtain, as a result of the data session being longer than the threshold time value, an indication to take part in a beam sweep procedure with the network node, the beam sweep procedure resulting in identification of a set of candidate beams in which the network node is able to serve the terminal device during the data session; and
- continue the data session in one of the candidate beams.

\* \* \* \* \*